(12) United States Patent
Chen et al.

(10) Patent No.: US 11,474,744 B2
(45) Date of Patent: Oct. 18, 2022

(54) METHOD, DEVICE, AND COMPUTER PROGRAM PRODUCT FOR MANAGING MEMORIES

(71) Applicant: EMC IP Holding Company LLC, Hopkinton, MA (US)

(72) Inventors: Chi Chen, Chengdu (CN); Hailan Dong, Chengdu (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 17/018,095

(22) Filed: Sep. 11, 2020

(65) Prior Publication Data
US 2021/0279002 A1    Sep. 9, 2021

(30) Foreign Application Priority Data

Mar. 9, 2020 (CN) .......................... 202010158684.3

(51) Int. Cl.
*G06F 3/06* (2006.01)
(52) U.S. Cl.
CPC .......... *G06F 3/0659* (2013.01); *G06F 3/0611* (2013.01); *G06F 3/0673* (2013.01)
(58) Field of Classification Search
CPC .... G06F 3/0659; G06F 3/0611; G06F 3/0613; G06F 3/0673
See application file for complete search history.

(56) References Cited

U.S. PATENT DOCUMENTS

| | | | |
|---|---|---|---|
| 6,170,042 B1* | 1/2001 | Gaertner | G06F 3/0613 710/39 |
| 7,233,977 B2 | 6/2007 | Gupta et al. | |
| 7,996,574 B2 | 8/2011 | Gupta et al. | |
| 9,965,323 B2* | 5/2018 | Rimoni | G06F 3/0688 |
| 10,146,574 B1 | 12/2018 | Krivenok et al. | |
| 10,372,477 B2 | 8/2019 | Liu et al. | |
| 10,410,219 B1 | 9/2019 | El-Nakib | |
| 10,664,401 B2 | 5/2020 | Xu et al. | |
| 10,681,118 B2 | 6/2020 | Zhao et al. | |
| 10,853,250 B2 | 12/2020 | Xu et al. | |
| 10,884,781 B2 | 1/2021 | Liu et al. | |
| 10,922,134 B2 | 2/2021 | Zhang et al. | |
| 2004/0194095 A1* | 9/2004 | Lumb | G06F 9/4887 718/100 |
| 2008/0077720 A1* | 3/2008 | Fanning | G06F 13/1642 710/240 |
| 2008/0307130 A1* | 12/2008 | Chang | G06F 3/0673 710/74 |
| 2011/0131385 A1* | 6/2011 | Henriksson | G06F 13/1642 711/158 |
| 2015/0169341 A1* | 6/2015 | Gulati | G06F 9/45533 718/1 |

(Continued)

*Primary Examiner* — Tracy A Warren
(74) *Attorney, Agent, or Firm* — BainwoodHuang (57) ABSTRACT

Techniques for managing memory involve: determining a set of weights corresponding to a plurality of command queues in the memory, each weight indicating the number of commands allowed to be transmitted in a corresponding command queue; detecting whether a transmission delay occurs in the plurality of command queues; and adjusting the set of weights based on a result of the detection. Accordingly, transmission and processing efficiencies of commands in a command queue can be improved, and transmission bandwidth can be used more efficiently.

10 Claims, 5 Drawing Sheets

(56) References Cited

U.S. PATENT DOCUMENTS

| | | | |
|---|---|---|---|
| 2019/0102090 A1* | 4/2019 | Guim Bernat | G06F 3/0611 |
| 2019/0258514 A1* | 8/2019 | Miao | G06F 9/4881 |
| 2021/0064286 A1* | 3/2021 | Jung | G06F 3/0611 |
| 2021/0124497 A1* | 4/2021 | Bert | G06F 3/0611 |

* cited by examiner

METHOD, DEVICE, AND COMPUTER PROGRAM PRODUCT FOR MANAGING MEMORIES

CROSS-REFERENCE TO RELATED APPLICATION

This application claims priority to Chinese Patent Application No. CN202010158684.3, on file at the China National Intellectual Property Administration (CNIPA), having a filing date of Mar. 9, 2020, and having "METHOD, DEVICE, AND COMPUTER PROGRAM PRODUCT FOR MANAGING MEMORIES" as a title, the contents and teachings of which are herein incorporated by reference in their entirety.

TECHNICAL FIELD

Embodiments of this disclosure generally relate to the field of memories, and in particular, to a method, a device, and a computer program product for managing a memory.

BACKGROUND

Command queues for a memory can serve different requirements. For example, input/output (I/O) command queues can serve different I/O requirements. There are various types of command queues, such as user I/O command queues, reconstruction I/O command queues, and storage area network (SAN) replication I/O command queues. When another command queue exists, transmission and processing of commands in a user I/O command queue may be affected, resulting in an increased user I/O delay. This is unacceptable to users.

At present, a solution to the problem is to set a relatively low reconstruction I/O rate to avoid affecting the user I/O. However, in the event of a low user I/O requirement, such a solution is inefficient because the transmission bandwidth is underutilized.

SUMMARY OF THE INVENTION

A method, a device, and a computer program product for managing a memory are provided in the embodiments of this disclosure.

In a first aspect of this disclosure, a method for managing a memory is provided. The method includes: determining a set of weights corresponding to a plurality of command queues in the memory, each weight indicating the number of commands allowed to be transmitted in a corresponding command queue; detecting whether a transmission delay occurs in the plurality of command queues; and adjusting the set of weights based on a result of the detection.

In a second aspect of this disclosure, an electronic device is provided. The electronic device includes: at least one processing unit; and at least one memory coupled to the at least one processing unit and storing instructions for execution by the at least one processing unit, wherein when executed by the at least one processing unit, the instructions cause the electronic device to perform actions including: determining a set of weights corresponding to a plurality of command queues in the memory, each weight indicating the number of commands allowed to be transmitted in a corresponding command queue; detecting whether a transmission delay occurs in the plurality of command queues; and adjusting the set of weights based on a result of the detection.

In a third aspect of this disclosure, a computer program product is provided. The computer program product is tangibly stored in a non-transitory computer storage medium and includes machine-executable instructions. When executed by a device, the machine-executable instructions cause the device to perform any step of the method described according to the first aspect of this disclosure.

The summary is provided to introduce the choice of concepts in a simplified form, which will be further described in the detailed description below. The summary is neither intended to identify important features or necessary features of this disclosure, nor intended to limit the scope of this disclosure.

BRIEF DESCRIPTION OF THE DRAWINGS

The above and other objectives, features, and advantages of this disclosure will become more apparent based on more detailed description of example embodiments of this disclosure with reference to accompanying drawings. In the example embodiments of this disclosure, identical reference numerals generally represent identical components in the example embodiments of this disclosure.

Identical or corresponding numerals represent identical or corresponding parts in various drawings.

DETAILED DESCRIPTION

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document.

It should be understood that the specialized circuitry that performs one or more of the various operations disclosed herein may be formed by one or more processors operating in accordance with specialized instructions persistently stored in memory. Such components may be arranged in a variety of ways such as tightly coupled with each other (e.g., where the components electronically communicate over a computer bus), distributed among different locations (e.g., where the components electronically communicate over a computer network), combinations thereof, and so on.

Embodiments of this disclosure will be described in more detail below with reference to the accompanying drawings. The embodiments of this disclosure have been shown in the accompanying drawings. However, it should be appreciated that this disclosure can be implemented in various forms and should not be limited by the embodiments described here. In contrast, these embodiments are provided so that this disclosure becomes more thorough and complete, and the scope of this disclosure can be fully conveyed to those skilled in the art.

The term "include/comprise" and variants thereof used herein indicate open inclusion, i.e., "including/comprising, but not limited to." Unless specifically stated, the term "or" indicates "and/or." The term "based on" indicates "based at least in part on." The terms "an example embodiment" and "an embodiment" indicate "at least one example embodiment." The term "another embodiment" indicates "at least one additional embodiment." The terms "first," "second," and the like may refer to different or identical objects. Other explicit and implicit definitions may also be included below.

As mentioned above, command queues for a memory, such as I/O command queues, generally may be of different types, such as user I/O command queues, reconstruction I/O command queues, and storage area network (SAN) replication I/O command queues. Different types of command queues serve different requirements. Under some circumstances, for example, when another command queue exists, transmission and processing of commands in a user I/O command queue may be affected, resulting in an increased user I/O delay. This is unacceptable to users.

At present, a solution to the problem is to set a relatively low reconstruction I/O rate to avoid affecting the user I/O. However, in the event of a low user I/O requirement, such a solution is inefficient because the transmission bandwidth is underutilized. In addition, such a solution will add a reconstruction time window, which may result in the following problem: if the memory fails during the reconstruction time window, there may be a problem of data unavailability (DU) or data loss (DL).

In a conventional solution, different priorities may be set for different command queues. In this manner, a command queue with a higher priority can transmit more commands than other command queues in each poll. Such a solution is also referred to as weighted poll. However, in a conventional weighted poll method, the priority corresponding to each command queue is static, and a user I/O delay may still occur when a user I/O requirement is high.

A solution for managing a memory is proposed in embodiments of this disclosure to solve the above problems and one or more of other potential problems. According to the solution, a weight corresponding to a command queue is dynamically adjusted by detecting whether a transmission delay occurs in the command queue, thus avoiding influences of other I/Os on a user I/O, and ensuring the quality of service (QoS) for the user I/O.

Figure 1:
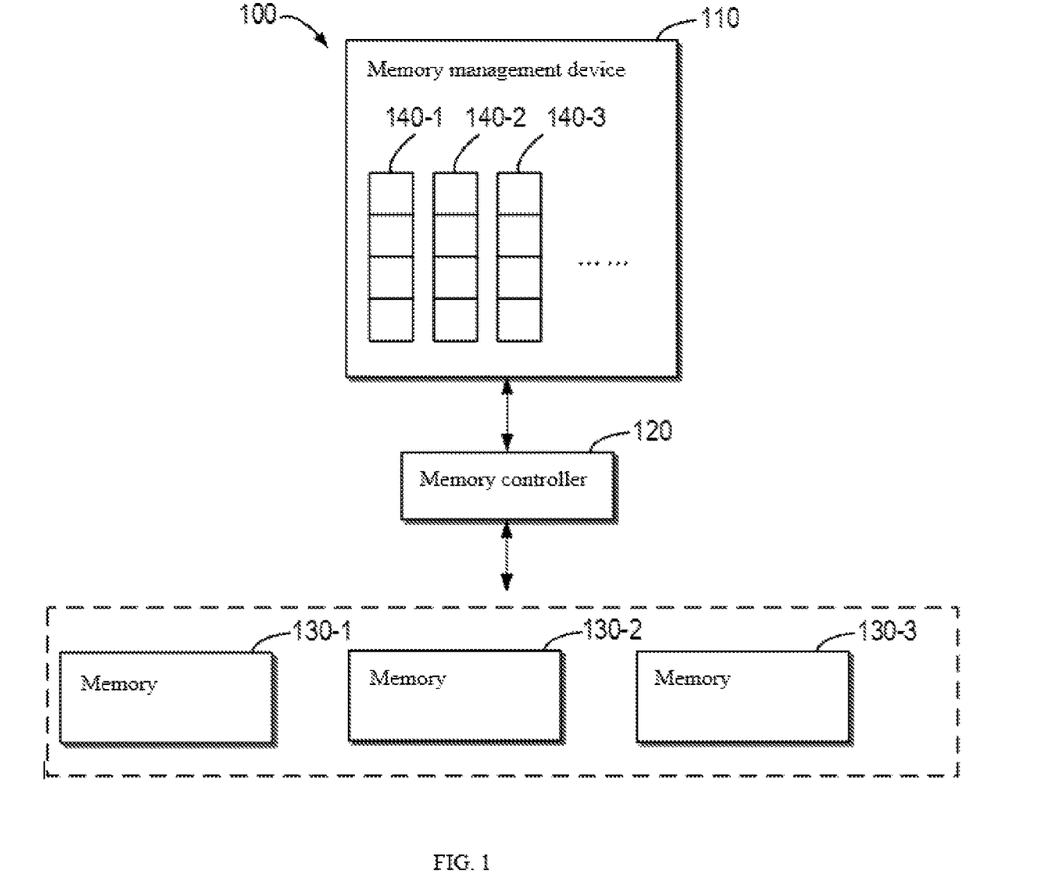
FIG. 1 is a block diagram of an example memory management system in which an embodiment of this disclosure can be implemented.

FIG. 1 is a block diagram of example memory management system 100 in which embodiments of this disclosure can be implemented. As shown in FIG. 1, memory management system 100 includes memory management device 110, memory controller 120, and memories 130-1 to 130-3 (collectively referred to as "memory 130"). Various methods according to the embodiments of this disclosure can be implemented at memory management system 110.

Memory management system 110 may be a device that manages various types of command queues 140-1 to 140-3 (collectively referred to as "command queue 140") for a memory and specifies weights for different command queues 140. Memory management system 110 may be, for example, a computer, a virtual machine, a server, or the like, and this disclosure is not limited in this aspect. Memory controller 120 may be a device that determines how to process commands in command queue 140 and controls memory 130 according to the commands. Memory 130 may be various types of memories, such as a non-volatile memory and a volatile memory, and this disclosure is not limited in this aspect.

In some embodiments, memory management system 110, memory controller 120 and memory 130 are separate devices that communicate with each other over a network. The network may be, for example, the Internet, an Intranet, or the like. Alternatively, in some other embodiments, memory management device 110, memory controller 120 and memory 130 can be integrated into the same device and communicate with each other over a bus.

In some embodiments, memory controller 120 may be, for example, a high-speed non-volatile memory (NVMe) controller, which can control memory 130 according to a storage protocol designed for non-volatile memories. The storage protocol can support a plurality of depth command queues and improve the concurrency of command processing by utilizing a large number of command queues between memory management device 110 and memory 130. Additionally, in some embodiments, memory controller 120 can control memory 130 by using a current NAND flash memory technology and a next-generation NVM technology.

Additionally, in some embodiments, memory controller 120 supports a poll control method. Memory management device 110 may not specify weights for command queue 140 in the poll control method. In other words, command queue 140 may have the same weight. In this case, memory controller 120 will extract the same number of commands from each command queue and transmit them to memory 130.

It should be appreciated that the structure of memory management system 100 is described for an illustrative purpose only and does not imply any limitation to the scope of this disclosure. For example, the embodiments of this disclosure can also be applied to a system different from memory management system 100. It should be appreciated that the specific numbers of the devices and command queues described above are given for illustrative purposes only and do not imply any limitation to the scope of this disclosure. For example, the embodiments of this disclosure can also be applied to more or fewer memories and command queues.

Figure 2:
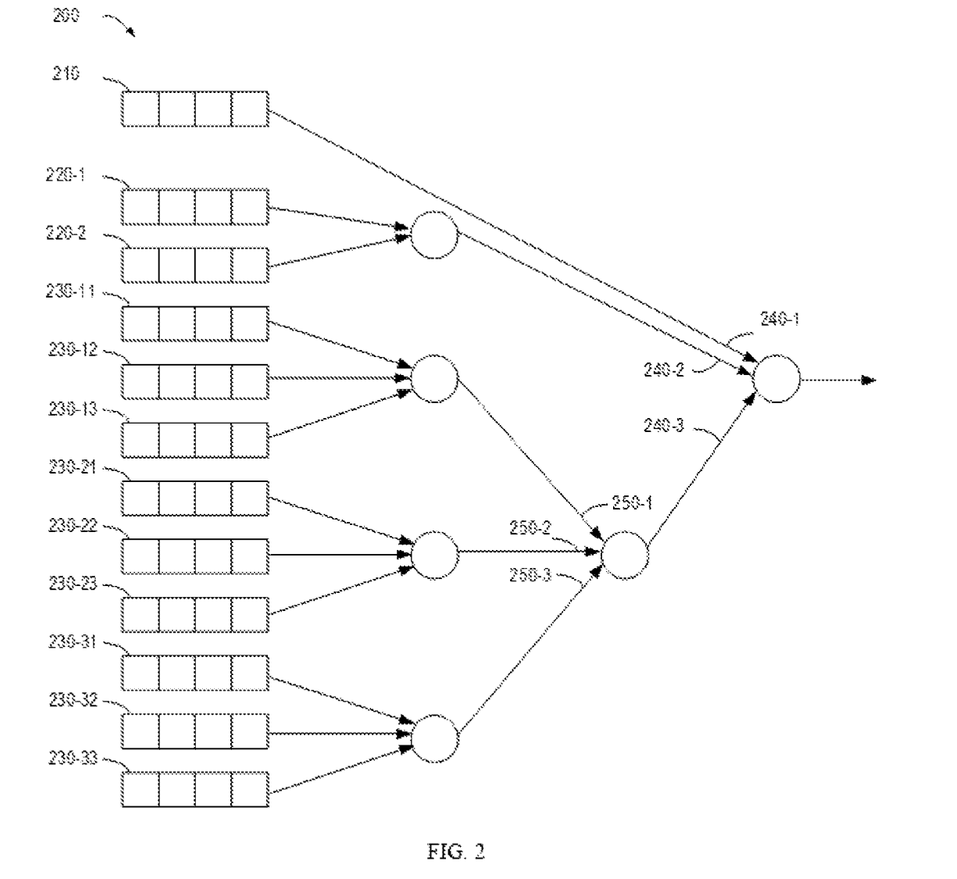
FIG. 2 is a schematic diagram of an example command queue set in an embodiment of this disclosure.

FIG. 2 is a schematic diagram of example command queue set 200 in an embodiment of this disclosure.

As shown in FIG. 2, command queue set 200 may include command queues to which different first priorities 240-1 to 240-3 are specified. For example, command queue 210 corresponds to first priority 240-1, command queues 220-1 to 220-2 (collectively referred to as "command queue 220") correspond to first priority 240-2, and command queues 230-11 to 230-33 (collectively referred to as "command queue 230") correspond to first priority 240-3. In some embodiments, an order of first priorities 240-1 to 240-3 may be: first priority 240-1>first priority 240-2>first priority 240-3. Command queue 210 corresponding to first priority 240-1 may be an administration-level command queue of memory management device 110, and command queue 220 corresponding to first priority 240-2 may be a command queue that needs to be processed urgently. Command queue 230 corresponding to first priority 240-3 may be a command queue of other various types to be transmitted by cores (not shown) in memory management device 110. All commands in a command queue corresponding to a higher first priority may be processed prior to commands in a command queue corresponding to a lower first priority. For example, referring to FIG. 2, commands in command queue 220 are processed only after commands in command queue 210 have been processed. Similarly, commands in command queue 230 are processed only after the commands in command queue 220 have been processed. What is to be discussed in the embodiment of this disclosure is various command queues in command queue 230, that is, various command queues corresponding to a lower first priority.

In some embodiments, as mentioned above, command queue 230 may be a command queue of various types to be transmitted by cores in memory management device 110. Memory management device 110 can specify weights 250-1 to 250-3 (collectively referred to as weight 250) for each command queue 230. Since the command queues with a higher first priority, such as command queues 210 and 220, have already occupied some transmission bandwidth, command queues 230 corresponding to weights 250-1 to 250-3 share the remaining bandwidth. Additionally, in some embodiments, command queues 230 share the remaining bandwidth by means of weighted poll. For example, if memory management device 110 specifies the weight of command queues 230-11 to 230-13 (collectively referred to as "command queue 230-1") as 80, the weight of command queues 230-21 to 230-23 (collectively referred to as "command queue 230-2") as 16, and the weight of command queues 230-31 to 230-33 (collectively referred to as "command queue 230-3") as 4, memory controller 120 will extract commands from command queues 230-1 to 230-3 in a ratio of 80:16:4 each time. The total number of commands that can be extracted by memory controller 120 each time depends on the size of the remaining bandwidth. Additionally, in some embodiments, memory controller 120 extracts the same number of commands from various command queues corresponding to the same weight. For example, memory controller 120 extracts the same number of commands from command queues 230-11 to 230-13 corresponding to the same weight 250-1. Additionally, in some embodiments, if the actual number of commands in a command queue corresponding to a weight is less than the number of commands allowed to be transmitted thereof, more commands can be extracted from a command queue corresponding to another weight.

As mentioned above, in the conventional solution, memory management device 110 only specifies the weight of each command queue at the beginning. In other words, the weight is static. In the embodiment of this disclosure, weights corresponding to different command queues are dynamically adjusted by detecting whether a transmission delay occurs in the command queues.

It should be appreciated that the specific number and priorities of the command queues, the specific number of the weights, and the specific values of the weights are given for illustrative purposes only and do not imply any limitation to the scope of this disclosure. For example, the embodiment of this disclosure can also be applied to more or fewer command queues, and other weighted values can also be used.

Figure 3:
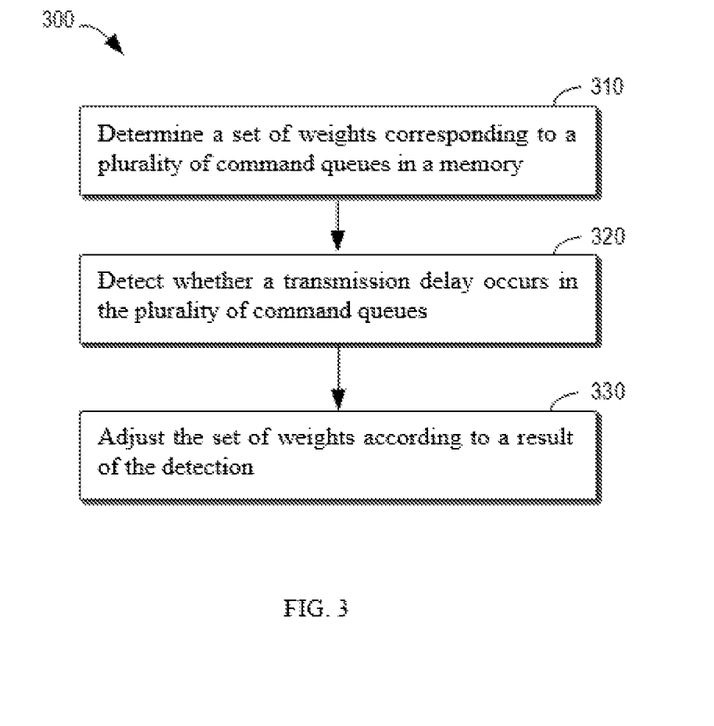
FIG. 3 is a flowchart of an example method for managing a memory according to an embodiment of this disclosure.

FIG. 3 is a flowchart of example method 300 for managing a memory according to an embodiment of this disclosure. For example, method 300 can be implemented by memory management device 110 as shown in FIG. 1. It should be appreciated that method 300 can also be implemented by another device, and the scope of this disclosure is not limited in this aspect. It should also be appreciated that method 300 may also include additional actions not shown and/or may omit the shown actions, and the scope of this disclosure is not limited in this aspect.

In 310, memory management device 110 may determine a set of weights corresponding to a plurality of command queues in the memory.

As described above in detail in FIG. 2, a weight has been specified to each command queue 230. Each weight indicates the number of commands allowed to be transmitted in a corresponding command queue. Additionally, in some embodiments, if the actual number of commands in a command queue corresponding to a weight is less than the number of commands allowed to be transmitted thereof, more commands can be extracted from a command queue corresponding to another weight.

Additionally, in some embodiments, it is assumed that memory management device 110 intends to specify three weights HPW, MPW, and LPW, minimum fluxes of command queues corresponding to the weights are THP, TMP, and TLP respectively, and the total flux of the command queues is Ta. Since HPW:MPW:LPW=THP:TMP:TLP, HPW, MPW, and LPW can be specified as THP/Ta, TMP/Ta, and TLP/Ta respectively.

Additionally, for example, in some embodiments, memory management device 110 may have specified a set of weights for different types of command queues, such as user I/O command queues, reconstruction I/O command queues, and storage area network (SAN) replication I/O command queues. Additionally or alternatively, command queues of the same type may come from different cores of memory management device 110. The same core may include different types of command queues. Additionally, in some embodiments, memory management device 110 may specify weights, from high to low, of a user I/O command queue, a reconstruction I/O command queue, and a storage area network (SAN) replication I/O command queue.

In 320, memory management device 110 may detect whether a transmission delay occurs in the plurality of command queues.

In some embodiments, memory management device 110 may determine a time length required to transmit commands in one command queue of the plurality of command queues. For example, in some embodiments, for a command queue in the plurality of command queues, memory management device 110 may record a timestamp when transmission of one command in the command queue begins, and after the command is received by memory controller 120, receive from memory controller 120 a response indicating completion of the transmission. Memory management device 110 may determine, according to the timestamp when transmission of the command begins and a timestamp when the response is received, a time length required for transmitting the command. If the time length is greater than a threshold time length, memory management device 110 may determine that a transmission delay occurs in the command queue. On the contrary, if the time length is not greater than the threshold time length, memory management device 110 may determine that no transmission delay occurs in the command queue.

In 330, memory management device 110 can adjust the set of weights according to a result of the detection.

In some embodiments, if memory management device 110 detects that the transmission delay occurs in a first command queue of the plurality of command queues, memory management device 110 determines a first weight corresponding to the first command queue from the set of weights, and then memory management device 110 determines at least one weight lower than the first weight from the set of weights and decreases the at least one weight.

For example, in some embodiments, if memory management device 110 detects that a transmission delay occurs in a user I/O command queue assigned with a high first weight, memory management device 110 may decrease at least one weight lower than the first weight. For example, memory management device 110 may decrease weights corresponding to a reconstruction I/O command queue and a SAN replication I/O command queue, so that more commands in the user I/O command queue are extracted by memory controller 120. Additionally, in some embodiments, memory management device 110 may set at least one weight lower than the first weight as half of its current value to quickly alleviate the transmission delay.

Additionally or alternatively, in some embodiments, if memory management device 110 detects that no transmission delay occurs in the user I/O command queue set with a high weight and that a transmission delay occurs in the reconstruction I/O command queue set with a second high weight, memory management device 110 may determine that the first weight is a weight corresponding to the reconstruction I/O command queue and then decrease the weight lower than the first weight and corresponding to the SAN replication I/O command queue. Similarly, memory management device 110 may set the weight corresponding to the SAN replication I/O command queue as half of its current value to quickly alleviate the transmission delay.

In the above example embodiment, weights corresponding to different command queues are dynamically adjusted by detecting whether a transmission delay occurs in the command queues, avoiding influences of other I/Os on the I/O with a high weight, such as the user I/O, thus ensuring the quality of service (QoS). In addition, in this manner, the problem of data unavailability or data loss that may result from extension of the reconstruction time window is avoided.

Figure 4:
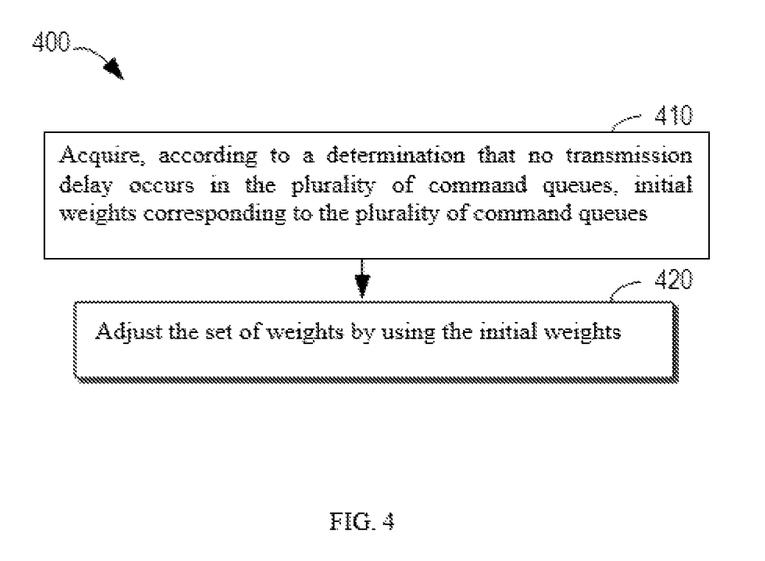
FIG. 4 is a flowchart of an example method for adjusting a set of weights according to an embodiment of this disclosure.

FIG. 4 is a flowchart of example method 400 for adjusting a set of weights according to an embodiment of this disclosure. Method 400 is an embodiment of block 330 in method 300. For example, method 400 can be implemented by memory management device 110 as shown in FIG. 1. It should be appreciated that method 400 can also be implemented by another device, and the scope of this disclosure is not limited in this aspect. It should also be appreciated that method 400 may also include additional actions not shown and/or may omit the shown actions, and the scope of this disclosure is not limited in this aspect.

In 410, memory management device 110 acquires, according to a determination that no transmission delay occurs in a plurality of command queues, initial weights corresponding to the plurality of command queues. In 420, memory management device 110 adjusts the set of weights by using the initial weights.

For example, in some embodiments, if memory management device 110 detects that no transmission delay occurs in the command queues, memory management device 110 needs to determine whether a current weight corresponding to each command queue is lower than the initial weight, and if the current weight is lower than the initial weight, increase the current weight to prevent the weight from being too low and then causing a delay in the command queue corresponding to the weight. Additionally, in some embodiments, memory management device 110 may slowly increase the current weight. For example, memory management device 110 increases the weight by 1 each time.

In the example embodiment, by increasing the current weight to restore it to the initial weight when detecting no transmission delay occurs in the command queues, the I/O with a low weight can fully utilize the bandwidth when the requirement from the I/O with a high weight decreases.

Figure 5:
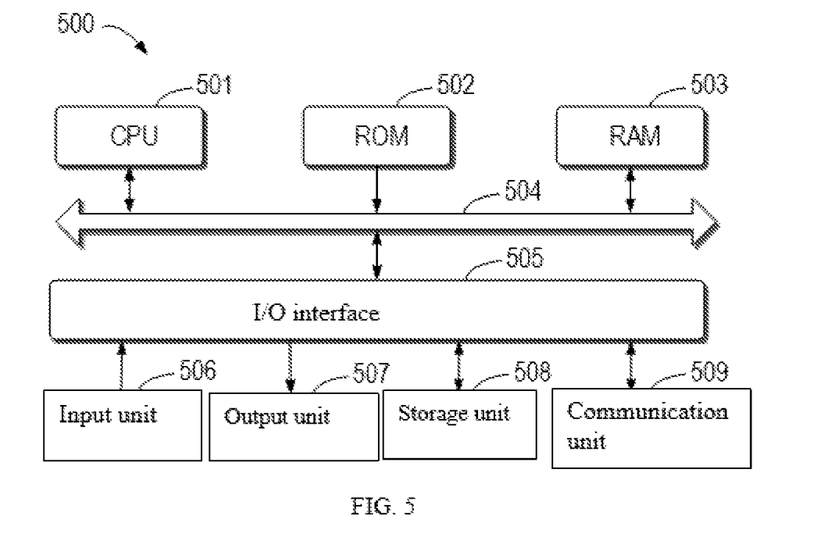
FIG. 5 is a schematic block diagram of an example electronic device that can be used to implement an embodiment of this disclosure.

FIG. 5 is a schematic block diagram of example electronic device 500 that can be used to implement an embodiment of this disclosure. For example, memory management device 110 as shown in FIG. 1 can be implemented by electronic device 500. As shown in FIG. 5, electronic device 500 includes central processing unit (CPU) 501 that can perform various appropriate actions and processing according to computer program instructions stored in read-only memory (ROM) 502 or computer program instructions loaded from storage unit 508 to random access memory (RAM) 503. Various programs and data required for the operation of electronic device 500 can also be stored in RAM 503. CPU 501, ROM 502, and RAM 503 are connected to each other through bus 504. Input/output (I/O) interface 505 is also connected to bus 504.

A plurality of components in electronic device 500 are connected to I/O interface 505, including: input unit 506, such as a keyboard and a mouse; output unit 507, such as various types of displays and speakers; storage unit 508, such as a magnetic disk and an optical disc; and communication unit 509, such as a network card, a modem, and a wireless communication transceiver. Communication unit 509 allows electronic device 500 to exchange information/data with other devices over a computer network such as the Internet and/or various telecommunication networks.

Various processes and processing described above, for example, method 300 and method 400, may be performed by processing unit 501. For example, in some embodiments, method 300 and method 400 can be implemented as a computer software program that is tangibly included in a machine-readable medium such as storage unit 508. In some embodiments, some or all of the computer program can be loaded and/or installed onto electronic device 500 via ROM 502 and/or communication unit 509. When the computer program is loaded into RAM 503 and executed by CPU 501, one or more actions of method 300 and method 400 described above may be implemented.

This disclosure may be a method, an apparatus, a system, and/or a computer program product. The computer program product may include a computer-readable storage medium having computer-readable program instructions for implementing various aspects of this disclosure loaded therein.

The computer-readable storage medium can be a tangible device capable of retaining and storing instructions used by an instruction-executing device. The computer-readable storage medium can be, for example, but is not limited to, an electrical storage device, a magnetic storage device, an optical storage device, an electromagnetic storage device, a semiconductor storage device, or any appropriate combination of the above. More specific examples (a non-exhaustive list) of the computer-readable storage medium include: a portable computer disk, a hard disk, a random access memory (RAM), a read-only memory (ROM), an erasable programmable read-only memory (EPROM or flash memory), a static random access memory (SRAM), a portable compact disk read-only memory (CD-ROM), a digital versatile disk (DVD), a memory stick, a floppy disk, a mechanical coding device such as a punch card or a protruding structure within a groove having instructions stored thereon, and any appropriate combination of the above. The computer-readable storage medium as used herein is not to be explained as transient signals per se, such as radio waves or other electromagnetic waves propagated freely, electromagnetic waves propagated through waveguides or other transmission media (e.g., light pulses propagated through fiber-optic cables), or electrical signals transmitted over electrical wires.

The computer-readable program instructions described here may be downloaded from the computer-readable storage medium to various computing/processing devices or downloaded to external computers or external storage devices over a network such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives computer-readable program instructions from a network and forwards the computer-readable program instructions for storage in the computer-readable storage medium in each computing/processing device.

The computer program instructions for performing the operations of this disclosure may be assembly instructions, instruction set architecture (ISA) instructions, machine instructions, machine-related instructions, microcode, firmware instructions, state setting data, or source code or object code written in any combination of one or more programming languages, including object-oriented programming languages such as Smalltalk and C++ as well as conventional procedural programming languages such as the "C" language or similar programming languages. The computer readable program instructions can be completely executed on a user's computer, partially executed on a user's computer, executed as a separate software package, partially executed on a user's computer and partially executed on a remote computer, or completely executed on a remote computer or a server. In the case where a remote computer is involved, the remote computer can be connected to a user's computer over any kind of networks, including a local area network (LAN) or a wide area network (WAN), or can be connected to an external computer (e.g., connected over the Internet using an Internet service provider). In some embodiments, an electronic circuit, such as a programmable logic circuit, a field programmable gate array (FPGA), or a programmable logic array (PLA), can be customized by utilizing state information of the computer-readable program instructions. The electronic circuit can execute the computer-readable program instructions to implement various aspects of this disclosure.

Various aspects of this disclosure are described here with reference to flowcharts and/or block diagrams of the method, apparatus (system), and computer program product according to the embodiments of this disclosure. It should be appreciated that each block in the flowcharts and/or block diagrams and a combination of blocks in the flowcharts and/or block diagrams can be implemented by computer program instructions.

The computer-readable program instructions can be provided to a processing unit of a general purpose computer, a special purpose computer, or another programmable data processing apparatus to produce a machine such that the instructions, when executed by the processing unit of the computer or another programmable data processing apparatus, generate an apparatus for implementing the functions/actions specified in one or more blocks in the flowcharts and/or block diagrams. The computer-readable program instructions may also be stored in the computer-readable storage medium, and the instructions cause the computer, the programmable data processing apparatus and/or other devices to work in a specific manner, such that the computer-readable medium storing the instructions includes an article of manufacture that includes instructions for implementing various aspects of the functions/actions specified in one or more blocks in the flowcharts and/or block diagrams.

The computer-readable program instructions may also be loaded onto a computer, another programmable data processing apparatus, or another device such that a series of operational steps are executed on the computer, another programmable data processing apparatus, or another device to produce a computer-implemented process. As such, the instructions executed on the computer, another programmable data processing apparatus, or another device implement the functions/actions specified in one or more blocks in the flowcharts and/or block diagrams.

The flowcharts and block diagrams in the accompanying drawings illustrate the architecture, functions, and operations of possible implementations of systems, methods, and computer program products according to multiple embodiments of this disclosure. In this regard, each block in the flowcharts or block diagrams can represent a module, a program segment, or a portion of instructions that includes one or more executable instructions for implementing specified logical functions. In some alternative implementations, functions labeled in the blocks may occur in an order different from that labeled in the accompanying drawing. For example, two successive blocks may actually be performed basically in parallel, or sometimes they can be performed in an opposite order, depending on the functions involved. It should also be noted that each block in the block diagrams and/or flowcharts and a combination of blocks in the block diagrams and/or flowcharts can be implemented using a dedicated hardware-based system for executing specified functions or actions, or can be implemented using a combination of dedicated hardware and computer instructions.

In accordance with certain embodiments, the memory described herein may be provided by one or more memory devices or circuits. Accordingly, the memory may be referred to as "a memory", "at least one memory", or simply "memory".

Various embodiments of this disclosure have been described above, and the foregoing description is illustrative rather than exhaustive, and is not limited to the disclosed various embodiments.

Numerous modifications and changes are apparent to those of ordinary skill in the art without departing from the scope and spirit of the illustrated various embodiments. The selection of terms as used herein is intended to best explain the principles and practical applications of the various embodiments or the technical improvements to technologies on the market, or to enable other persons of ordinary skill in the art to understand the embodiments disclosed herein.

The invention claimed is:

1. A method for managing memory, comprising:
   determining a set of weights corresponding to a plurality of command queues in the memory, the plurality of command queues all having the same priority and the set of weights comprising a plurality of different individual weights, each weight indicating the number of commands allowed to be transmitted in a corresponding command queue;
   detecting whether a transmission delay occurs in the plurality of command queues; and
   adjusting the set of weights based on a result of the detection, wherein adjusting the set of weights comprises:

acquiring, according to a determination that the transmission delay does not occur in the plurality of command queues, initial weights corresponding to the plurality of command queues; and adjusting the set of weights by using the initial weights, wherein adjusting the set of weights by using the initial weights comprises:

determining a current weight of a first command queue in the plurality of command queues from the set of weights; and increasing the current weight according to a determination that the current weight is lower than the initial weight of the first command queue.

2. The method of claim 1, wherein detecting whether the transmission delay occurs in the plurality of command queues comprises:

determining a time length required to transmit commands in a first command queue of the plurality of command queues; and determining, according to a determination that the time length is greater than a threshold time length, that the transmission delay occurs in the first command queue.

3. The method of claim 1, wherein adjusting the set of weights comprises:

determining, according to a determination that the transmission delay occurs in a first command queue of the plurality of command queues, a first weight corresponding to the first command queue from the set of weights;

determining at least one weight lower than the first weight from the set of weights; and decreasing the at least one weight.

4. An electronic device, comprising:

at least one processing unit; and memory coupled to the at least one processing unit and storing instructions for execution by the at least one processing unit, wherein when executed by the at least one processing unit, the instructions cause the electronic device to perform actions comprising:

determining a set of weights corresponding to a plurality of command queues in the memory, the plurality of command queues all having the same priority and the set of weights comprising a plurality of different individual weights, each weight indicating the number of commands allowed to be transmitted in a corresponding command queue;

detecting whether a transmission delay occurs in the plurality of command queues; and adjusting the set of weights based on a result of the detection, wherein adjusting the set of weights comprises:

acquiring, according to a determination that the transmission delay does not occur in the plurality of command queues, initial weights corresponding to the plurality of command queues; and adjusting the set of weights by using the initial weights, wherein adjusting the set of weights by using the initial weights comprises:

determining a current weight of a first command queue in the plurality of command queues from the set of weights; and increasing the current weight according to a determination that the current weight is lower than the initial weight of the first command queue.

5. The electronic device of claim 4, wherein detecting whether the transmission delay occurs in the plurality of command queues comprises:

determining a time length required to transmit commands in a first command queue of the plurality of command queues; and determining, according to a determination that the time length is greater than a threshold time length, that the transmission delay occurs in the first command queue.

6. The electronic device of claim 4, wherein adjusting the set of weights comprises:

determining, according to a determination that the transmission delay occurs in a first command queue of the plurality of command queues, a first weight corresponding to the first command queue from the set of weights;

determining at least one weight lower than the first weight from the set of weights; and decreasing the at least one weight.

7. A computer program product having a non-transitory computer readable medium which stores a set of instructions to manage memory; the set of instructions, when carried out by computerized circuitry, causing the computerized circuitry to perform a method of:

determining a set of weights corresponding to a plurality of command queues in the memory, the plurality of command queues all having the same priority and the set of weights comprising a plurality of different individual weights, each weight indicating the number of commands allowed to be transmitted in a corresponding command queue;

detecting whether a transmission delay occurs in the plurality of command queues; and adjusting the set of weights based on a result of the detection, wherein adjusting the set of weights comprises:

acquiring, according to a determination that the transmission delay does not occur in the plurality of command queues, initial weights corresponding to the plurality of command queues; and adjusting the set of weights by using the initial weights, wherein adjusting the set of weights by using the initial weights comprises:

determining a current weight of a first command queue in the plurality of command queues from the set of weights; and increasing the current weight according to a determination that the current weight is lower than the initial weight of the first command queue.

8. The method of claim 1, wherein the plurality of queues include a user I/O command queue and a reconstruction I/O command queue, and further comprising:

in response to detecting that a transmission delay occurs in the user I/O command queue, decreasing a weight corresponding to the reconstruction I/O command queue.

9. The method of claim 8, wherein the plurality of queues further includes a replication I/O command queue, and further comprising:

further in response to detecting that a transmission delay occurs in the user I/O command queue, also decreasing a weight corresponding to the replication I/O command queue.

10. The method of claim 2, wherein detecting whether the transmission delay occurs in the plurality of queues further comprises:

determining a time length required to transmit commands in a second command queue of the plurality of command queues; and determining, according to a determination that the time length is not greater than the threshold time length, that the transmission delay does not occur in the second command queue.

* * * * *